US012316062B2

(12) United States Patent
Boeddeker et al.

(10) Patent No.: US 12,316,062 B2
(45) Date of Patent: May 27, 2025

(54) CONNECTING APPARATUS AND ALSO ASSEMBLY AND ELECTRONIC DEVICE

(71) Applicant: Phoenix Contact GmbH & Co. KG, Blomberg (DE)

(72) Inventors: Martin Boeddeker, Detmold (DE); Kevin Berghahn, Blomberg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 330 days.

(21) Appl. No.: 17/802,980

(22) PCT Filed: Feb. 25, 2021

(86) PCT No.: PCT/EP2021/054675
§ 371 (c)(1),
(2) Date: Aug. 29, 2022

(87) PCT Pub. No.: WO2021/175693
PCT Pub. Date: Sep. 10, 2021

(65) Prior Publication Data

US 2023/0086440 A1 Mar. 23, 2023

(30) Foreign Application Priority Data

Mar. 2, 2020 (BE) .................................. 2020/5141

(51) Int. Cl.
*H01R 9/26* (2006.01)
*H01R 4/48* (2006.01)
*H01R 4/64* (2006.01)

(52) U.S. Cl.
CPC ............. *H01R 9/2608* (2013.01); *H01R 4/48* (2013.01); *H01R 4/64* (2013.01)

(58) Field of Classification Search
CPC ........... H01R 9/2608; H01R 4/48; H01R 4/64
See application file for complete search history.

(56) References Cited

U.S. PATENT DOCUMENTS 5,192,227 A * 3/1993 Bales .................. H01R 9/2608 439/716
2005/0029003 A1 2/2005 Conrad

FOREIGN PATENT DOCUMENTS

DE 4409206 C1 5/1995
DE 19642086 A1 * 4/1998 ........... H01R 9/2691
(Continued)

OTHER PUBLICATIONS

Written Opinion of the International Searching Authority and English translation, PCT/EP2021/054675, Mar. 19, 2021.

*Primary Examiner* — Renee S Iuebke
*Assistant Examiner* — Paul D Baillargeon
(74) *Attorney, Agent, or Firm* — LEYDIG, VOIT & MAYER, LTD.

(57) ABSTRACT

A connecting apparatus for connecting a current-carrying element to a rail element includes: a receiving body on which the current-conducting element is fastenable, the receiving body having a first transverse side and a second transverse side opposite the first transverse side, and a first longitudinal side and a second longitudinal side opposite the first longitudinal side; a first latching arm for fastening the connecting apparatus to the rail element; and a second latching arm for fastening the connecting apparatus to the rail element. The first latching arm is joined to the first transverse side of the receiving body. The second latching arm is joined to the second transverse side of the receiving body.

20 Claims, 4 Drawing Sheets

(56) References Cited

FOREIGN PATENT DOCUMENTS

| | | | |
|---|---|---|---|
| DE | 20003081 | U1 | 4/2000 |
| DE | 10315668 | B4 | 6/2007 |
| DE | 102009057514 | B3 | 6/2011 |
| JP | S4511877 | Y1 | 5/1970 |

* cited by examiner

CONNECTING APPARATUS AND ALSO ASSEMBLY AND ELECTRONIC DEVICE

CROSS-REFERENCE TO PRIOR APPLICATIONS

This application is a U.S. National Phase application under 35 U.S.C. § 371 of International Application No. PCT/EP2021/054675, filed on Feb. 25, 2021, and claims benefit to Belgian Patent Application No. BE 2020/5141, filed on Mar. 2, 2020. The International Application was published in German on Sep. 10, 2021 as WO/2021/175693 under PCT Article 21(2).

FIELD

The invention relates to a connecting apparatus for connecting a current-carrying element to a rail element. The invention further relates to an assembly comprising a current-carrying element, a rail element and such a connecting apparatus. The invention further relates to an electronic device.

BACKGROUND

Such a connecting apparatus can be attached along an attachment direction to a rail element in order to connect the connecting apparatus to the rail element in this way. By means of the connecting apparatus, for example, a shield terminal can be connected as a current-conducting element, such that this current-conducting element can be fastened to the rail element via the connecting apparatus.

A shield terminal serves to contact a shield conductor, for example in the form of a shield braid surrounding line cores of the electrical line, with a leakage potential, in particular a ground potential—for example a busbar, a support rail or a housing wall of an electrical system (for example, a switch cabinet). The contact is thereby to be resistant, in particular to temperature and corrosion (even in aggressive environments), in order to ensure reliable grounding of the shield conductor over the service life of an electrical system.

Rail elements may take different forms. For example, a so-called C-rail can have edge sections facing inwards towards one another, which form a slot opening between them. In contrast, other rail elements may be formed, for example, as a support rail with outwardly pointing lip or edge sections.

For example, DE 103 15 668 B4 discloses a connection terminal with a busbar and a socket section for latching attachment to a support rail.

SUMMARY

In an embodiment, the present invention provides a connecting apparatus for connecting a current-carrying element to a rail element, comprising: a receiving body on which the current-conducting element is fastenable, the receiving body having a first transverse side and a second transverse side opposite the first transverse side, and a first longitudinal side and a second longitudinal side opposite the first longitudinal side; a first latching arm configured to fasten the connecting apparatus to the rail element; and a second latching arm configured to fasten the connecting apparatus to the rail element, wherein the first latching arm is joined to the first transverse side of the receiving body, and wherein the second latching arm is joined to the second transverse side of the receiving body.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
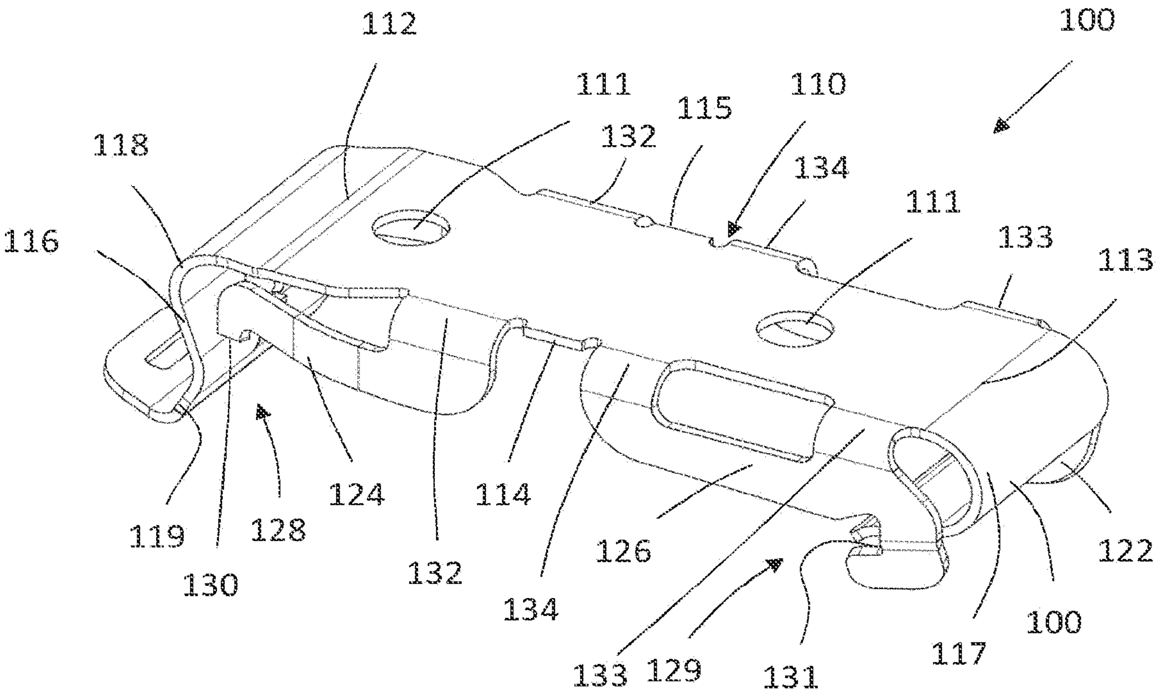
FIG. 1 is a schematic representation of a connecting apparatus according to the invention in a first side view.

In an embodiment, the present invention provides a connecting apparatus for connecting a current-carrying element to a rail element and a corresponding assembly and an electronic device, with which a particularly secure connection between the connecting apparatus and the rail element can be achieved.

The connecting apparatus according to the invention has a receiving body on which the current-conducting element can be fastened, wherein the receiving body has a first transverse side and a second transverse side opposite the first transverse side and a first longitudinal side and a second longitudinal side opposite the first longitudinal side. Furthermore, the connecting apparatus has a first latching arm for fastening the connecting apparatus to the rail element and a second latching arm for fastening the connecting apparatus to the rail element, wherein the first latching arm is joined to the first transverse side of the receiving body and the second latching arm is joined to the second transverse side of the receiving body.

The connecting apparatus is preferably formed from a conductive material, in particular a metal material. However, it is also possible for the connecting apparatus to be made of an insulating material, such as a plastic material. If the connecting apparatus is formed from a metal material, it can be a stamped and bent component. For receiving and fastening the current-conducting element, the connecting apparatus has a receiving body. The receiving body preferably has one or more fastening means via which the current-conducting element can be fastened to the receiving body. For example, the fastening means may take the form of holes, into which a screw element or rivet element of the current-carrying element can be inserted and fastened. Furthermore, the fastening means may also be formed in the form of latching elements that may be brought into a latching engagement with the current-carrying element. The receiving body is preferably formed to be flat or rectilinear. The receiving body can have the shape of a plate. The receiving body can have a rectangular shape. The receiving body has two transverse sides arranged opposite one another and two longitudinal sides arranged opposite one another. The longitudinal sides have a greater length than the transverse sides. A latching arm, via which the connecting apparatus can be fastened to the rail element, is joined to each of the two transverse sides. The latching arms are preferably joined to the transverse sides in such a way that such latching arms both form a lateral extension of the receiving body. The receiving body is thus formed or arranged between the two latching arms. If the connecting apparatus is placed on the rail element in the attachment direction, the latching arms may engage behind the rail element in order to form a fastening of the connecting apparatus to the rail element. In the fastened state, the latching arms may apply a contact force to the rail element, which acts on the rail element opposite the attachment direction of the connecting apparatus. The latching arms are preferably spring-elastic.

The first latching arm can be formed such that it forms a first linear contact with the rail element in a state fastened to the rail element, and/or the second latching arm can be formed such that it forms a second linear contact with the rail element in the state fastened to the rail element. A linear contact is preferably a linear contact in contrast to a point contact. The contact surface of a linear contact is thus larger than the area of a point contact. The first linear contact formed by the first latching arm preferably runs parallel to the second linear contact formed by the second latching arm. The two linear contacts preferably run transversely to the attachment direction. Preferably, the two linear contacts extend parallel to the two transverse sides of the receiving body. A particularly secure releasable fastening of the connecting apparatus to the rail element can be formed by the one or the two linear contacts. Furthermore, a breaking-open of the oxide layer on the rail element can be achieved in the region of the linear contacts, whereby a reduction in contact resistances can be achieved.

The first latching arm is preferably joined to the receiving body over the entire length of the first transverse side of the receiving body. Further preferably, the second latching arm is joined to the receiving body over the entire length of the second transverse side of the receiving body. A particularly large joining surface can thus be formed between the receiving body and the two latching arms. The width of the two latching arms is then in particular the same as the length of the two transverse sides on the joining region of the two latching arms on the two transverse sides of the receiving body. The connecting apparatus can thus have a particularly high degree of stability.

The first latching arm can have a latching element for the latching behind the rail element. The latching element can, for example, in the form of a tab or a lug be cut out or punched out of the latching arm and bent. The latching element projects preferably from the surface of the first latching arm in the direction of the rail element. The latching element can form a punctiform contact of the first latching element on the rail element.

Preferably, the latching element is formed in the region of the first linear contact. As a result, a particularly good introduction of force from the first latching arm onto the rail element can be achieved in order to be able to form a secure fastening of the connecting apparatus to the rail element. The punctiform contact formed by the latching element can overlay the linear contact, such that at the same time a linear contact can be formed together with a punctiform contact for fastening the first latching arm to the rail element.

In order to be able to release the connecting apparatus again from the rail element, the first latching arm can have a tool receiving region in which a tool, such as a screwdriver, can be inserted. By means of the tool, the first latching arm can be deflected such that the first latching arm can be released from the engagement with the rail element. The tool receiving region can be in the form of a recess or an opening.

The first latching arm preferably has a differently formed shape from the second latching arm. The type of rear latching of the first latching arm on the rail element is thus preferably also formed differently from the type of rear latching of the second latching arm on the rail element. Furthermore, the first latching arm and the second latching arm may be formed to have different lengths.

The first latching arm is preferably formed to have an S-shaped bend. The first latching arm thus preferably has two bends along its length. The linear contact of the first latching arm can be formed between the two bends. The linear contact can thus be formed in the first latching arm approximately in the center of the longitudinal extension of the first latching arm.

The second latching arm can, for example, be formed to have a U-shape bend. The second latching arm thus preferably has only one bend along its length. The linear contact of the second latching arm is preferably formed at a free end of the second latching arm.

In addition to the two latching arms, the connecting apparatus can have at least one support arm that can have a support surface with which a point contact with the rail element can be formed in the fastened state. The support surface can preferably rest on the rail element in the attachment direction in order to form the point contact. The support surface is formed on an edge surface of the support arm. The support arm is preferably joined to the receiving body via a 90° bend. The support arm preferably extends in a plane that is formed at right angles to the plane formed by the receiving body.

Preferably, a first support arm and a second support arm are provided, wherein the first support arm can be joined to the first longitudinal side of the receiving body and wherein the second support arm can be joined to the second longitudinal side of the receiving body. The two support arms preferably each extend in a plane that runs parallel to one another. The two support arms are preferably situated symmetrically to one another on the two longitudinal sides of the receiving body.

Furthermore, the connecting apparatus can have at least one holding arm that can have an end section bent in a U-shape that, in the fastened state of the connecting apparatus, can form a point contact with the rail element on the rail element. The holding arm thus preferably has a differently designed shape from the support arm. The holding arm can engage around a region of the rail element by means of the end section bent in a U-shape. The holding arm is preferably joined to the receiving body via a 90° bend. The holding arm preferably extends in a plane that is formed at a right angle to the plane formed by the receiving body.

Preferably, a first holding arm and a second holding arm are provided, wherein the first holding arm can be joined to the first longitudinal side of the receiving body and wherein the second holding arm can be joined to the second longitudinal side of the receiving body. The two holding arms preferably each extend in a plane that runs parallel to one another. The two holding arms are preferably situated symmetrically to one another on the two longitudinal sides of the receiving body.

The first support arm and the second support arm may form a first fastening unit together with the first latching arm and the first holding arm and the second holding arm may form a second fastening unit together with the second latching arm. Both the first fastening unit and the second fastening unit each have both a linear contact and point contacts, preferably two point contacts in each case, with the rail element. The two fastening units are thus formed on two opposite ends of the receiving body. The two fastening units may serve for fastening to two opposing fastening points on the rail element. Preferably, the two holding arms may laterally overlap the second latching arm at least in regions, such that the linear contact and the two point contacts of the second fastening unit formed by the two holding arms may take place in one plane. The two support arms preferably do not overlap the first latching arm laterally. The linear contact formed by the first latching arm is thus preferably formed in a different plane from the two point contacts of the first fastening unit formed by the two support arms.

In an embodiment, the present invention also provides an assembly that has a current-carrying element, a rail element and a connecting apparatus, wherein the connecting apparatus is designed and developed as described above. The current-conducting element is fastened to the connecting apparatus and the connecting apparatus is fastened to the rail element, such that the current-conducting element is held and fastened to the rail element via the connecting apparatus.

The current-conducting element can be, for example, a busbar, a shield terminal or a tapping terminal.

Furthermore, in an embodiment the present invention provides an electronic device, which has at least one subassembly designed and developed as described above.

Figure 2:
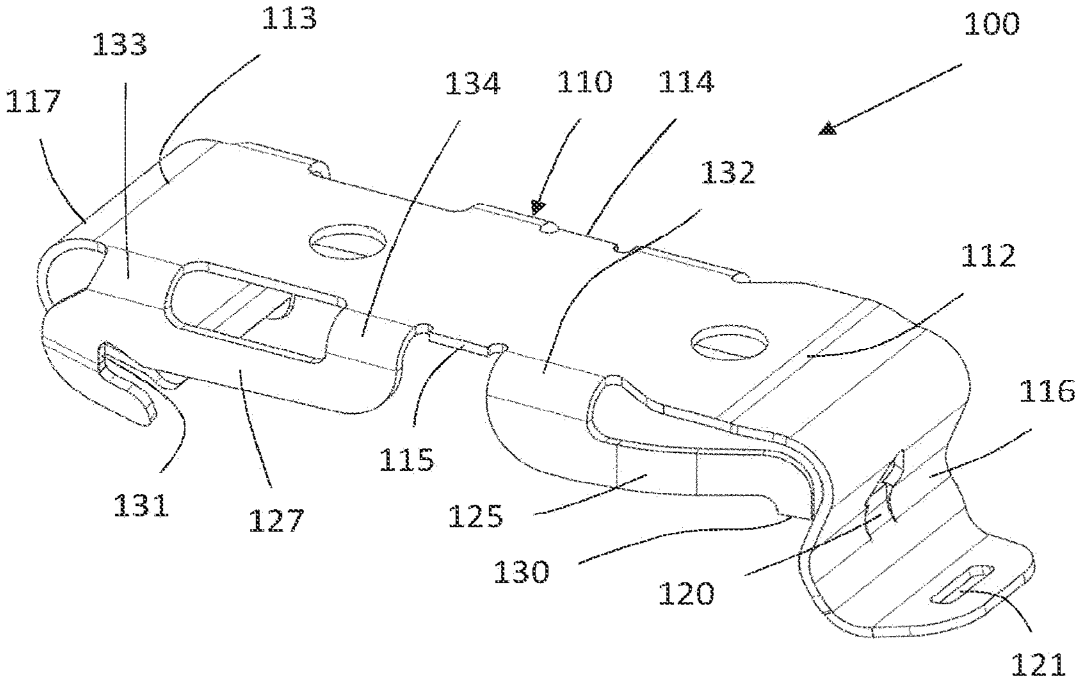
FIG. 2 is a schematic representation of the connecting apparatus shown in FIG. 1 in a second side view.
Figure 3:
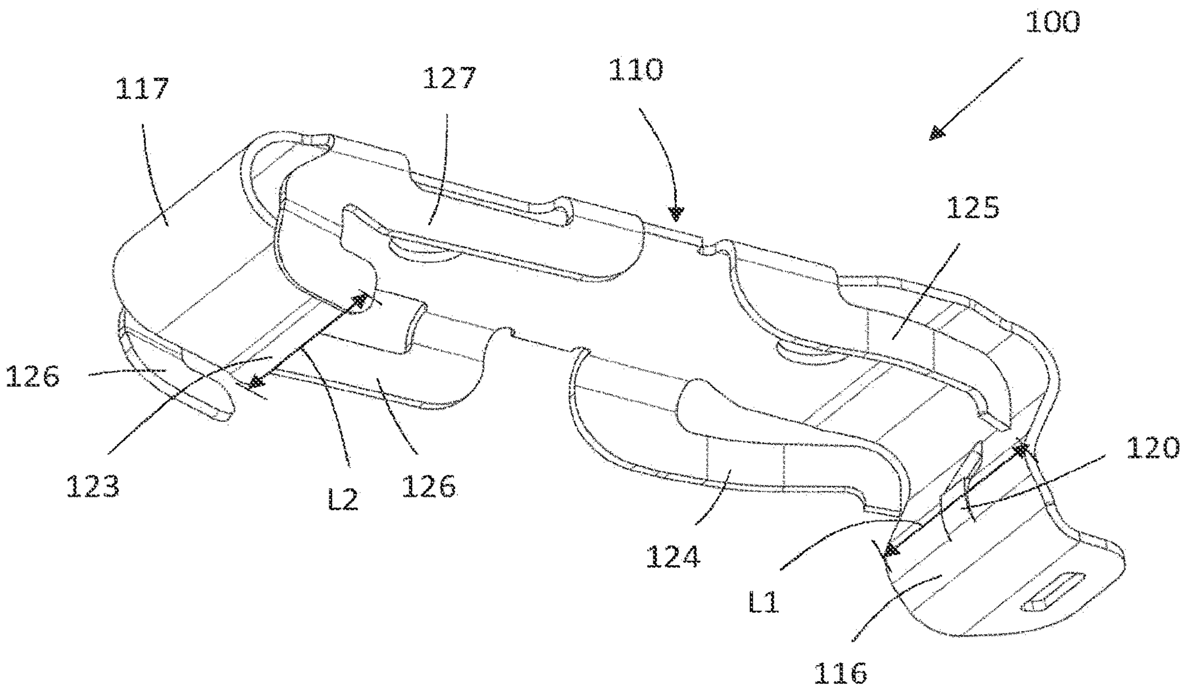
FIG. 3 is a schematic representation of the connecting apparatus shown in FIG. 1 in a view from below.

FIGS. 1 to 3 show a connecting apparatus 100 in different views. The connecting apparatus 100 is formed here from a metal part by the connecting apparatus 100 being punched out of a metal strip and bent into its shape. The connecting apparatus 100 is thus formed from an electrically conductive material. The connecting apparatus 100 is a stamped and bent component. The connecting apparatus 100 has elastic properties or spring properties at least in regions.

However, the connecting apparatus 100 can also be formed from an insulating material, such as a plastic material. In the embodiment shown in FIG. 8, the connecting apparatus 100 is made of an insulating material. In the embodiments shown in FIGS. 6 and 7, the connecting apparatus 100 is made of a metal material.

Figure 6:
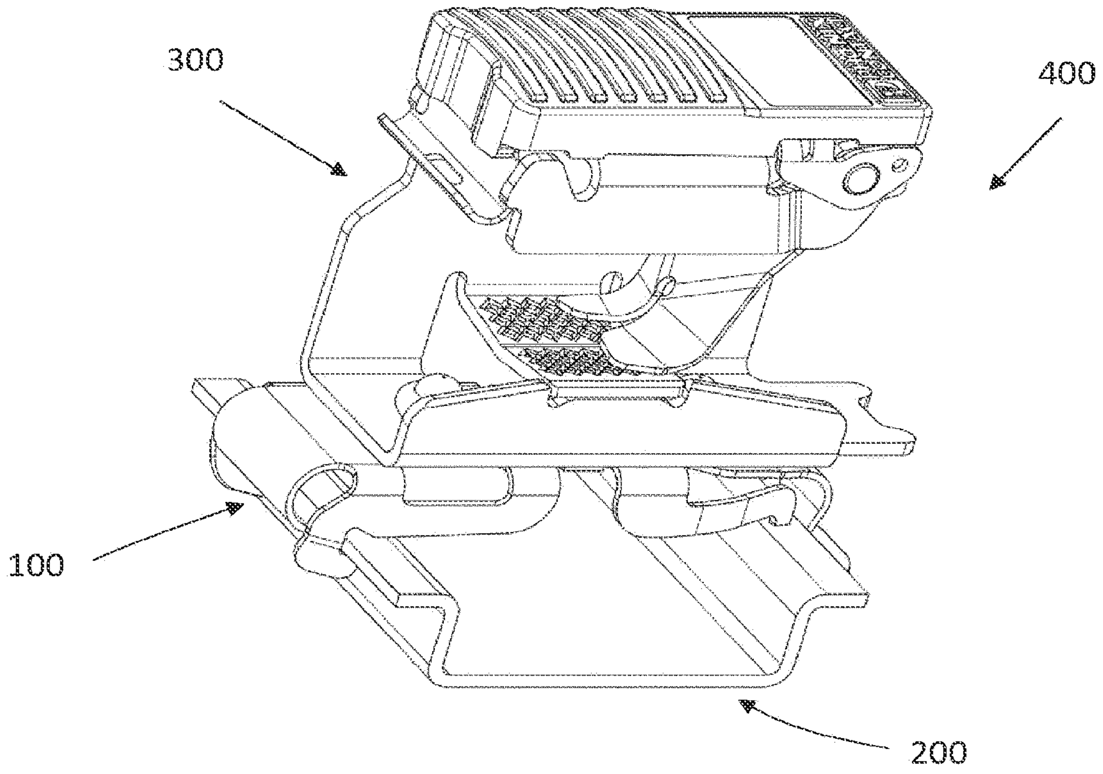
FIG. 6 is a schematic representation of an assembly according to the invention.
Figure 7:
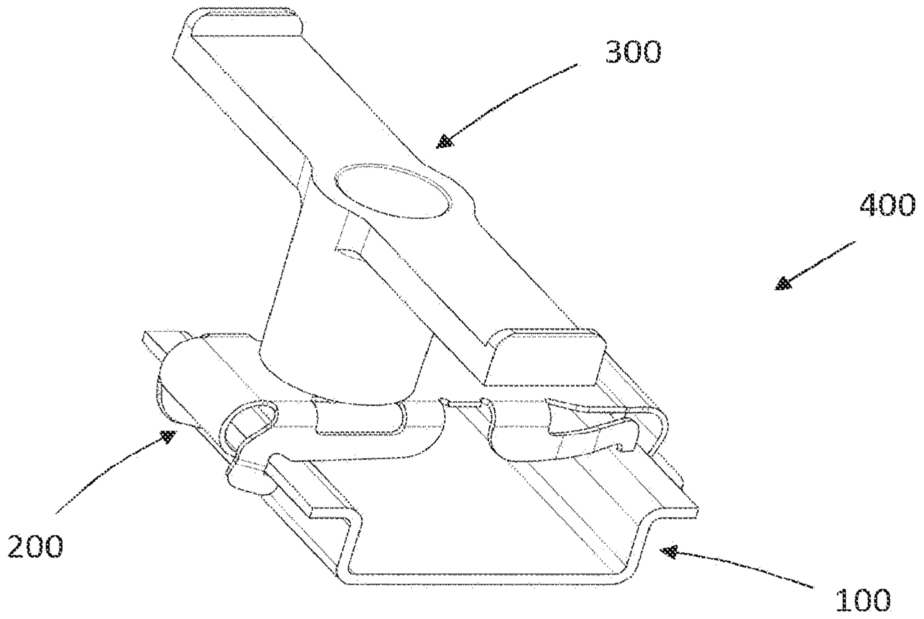
FIG. 7 is a schematic representation of a further assembly according to the invention.
Figure 8:
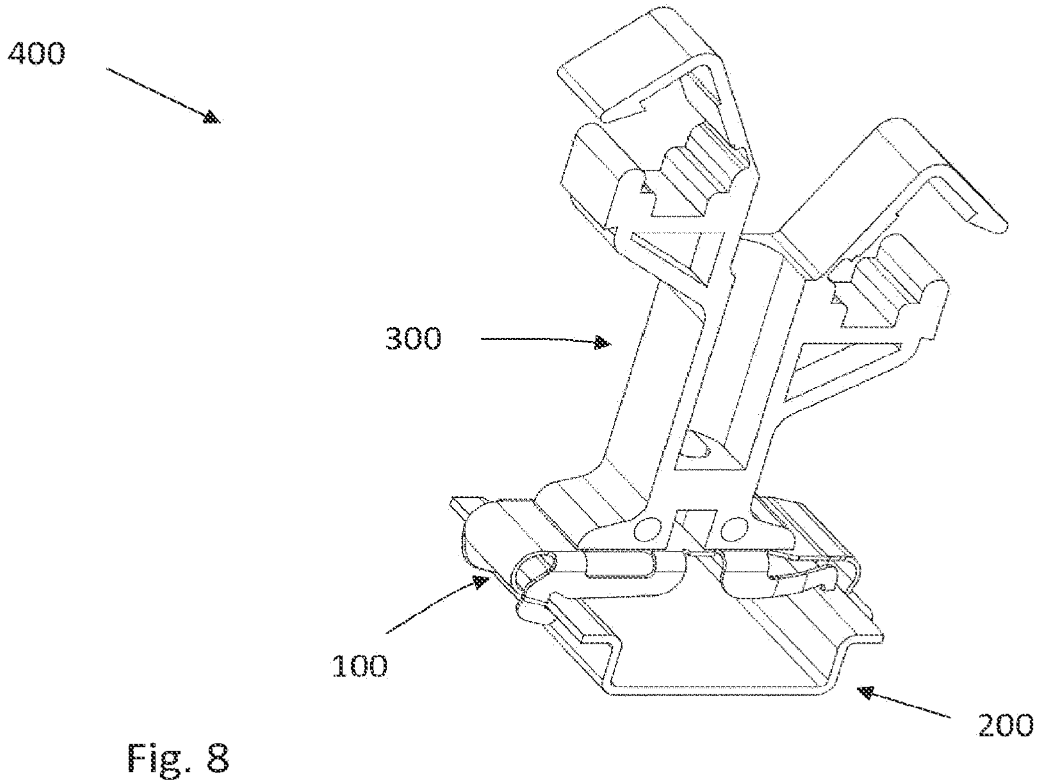
FIG. 8 is a schematic representation of a further assembly according to the invention.

The connecting apparatus 100 has a receiving body 110, on which a current-conducting element 200, as is shown in FIGS. 6 to 8, can be fastened. The receiving body 110 is formed to be flat or plane. The receiving body 110 has substantially a rectangular shape. Here, the receiving body 110 has two fastening means 111 in each case in the form of a hole, via which the current-conducting element 200 can be fastened to the receiving body 110. The two fastening means 111 are provided at a distance from one another on the receiving body 110.

The receiving body 110 is delimited by two transverse sides 112, 113 and two longitudinal sides 114, 115. The two transverse sides 112, 113 are formed at right angles to the two longitudinal sides 114, 115. The two longitudinal sides 114, 115 have a greater length than the two transverse sides 112, 113.

The connecting apparatus 100 has two latching arms 116, 117, via which the connecting apparatus 100 can be fastened to a rail element 200, as shown in FIGS. 4 to 8. The two latching arms 116, 117 are formed in one piece with the receiving body 110. In contrast to the linearly formed receiving body 110, the two latching arms 116, 117 are formed bent. The two latching arms 116, 117 are formed to be spring-elastic.

The first latching arm 116 is joined to the first transverse side 112 of the receiving body 110. The second latching arm 117 is joined to the second transverse side 113 of the receiving body 110. Thus, the two latching arms 116, 117 are joined to opposite ends of the receiving body 110. The two latching arms 116, 117 form an extension of the receiving body 110 in the longitudinal extension of the receiving body 110. The receiving body 110 extends between the two latching arms 116, 117.

The first latching arm 116 is formed such that it forms a first linear contact L1 with the rail element 200 in a state fastened to the rail element 200, as is shown in FIG. 3. The second latching arm 117 is formed such that it forms a second linear contact L2 with the rail element 200 in a state fastened to the rail element 200, as is also shown in FIG. 3. The two linear contacts L1, L2 are formed opposite one another on the rail element 200. The two linear contacts L1, L2 run parallel to one another. The linear contacts L1, L2 each form a linear contact with the rail element 200, wherein such linear contact extends along the width of the first latching arm 116 or along the width of the second latching arm 117. The first linear contact L1 is formed approximately centrally along the length or along the longitudinal extension of the first latching arm 116. By contrast, the second linear contact L2 is formed at a free end of the second latching arm 117.

Here, the two latching arms 116, 117 are joined to the receiving body 110 over the entire length of the first transverse side 112 or over the entire length of the second transverse side 113. In the embodiment shown here, the two linear contacts L1, L2 thus likewise correspond to the length of the first transverse side 112 or the second transverse side 113 of the receiving body 110 with their length.

The first latching arm 116 is formed to have an S-shaped bend, in that the first latching arm 116 has a first bend 118 and a second bend 119 formed at a distance therefrom. The linear contact L1 is formed between the two bends 118, 119.

Figure 5:
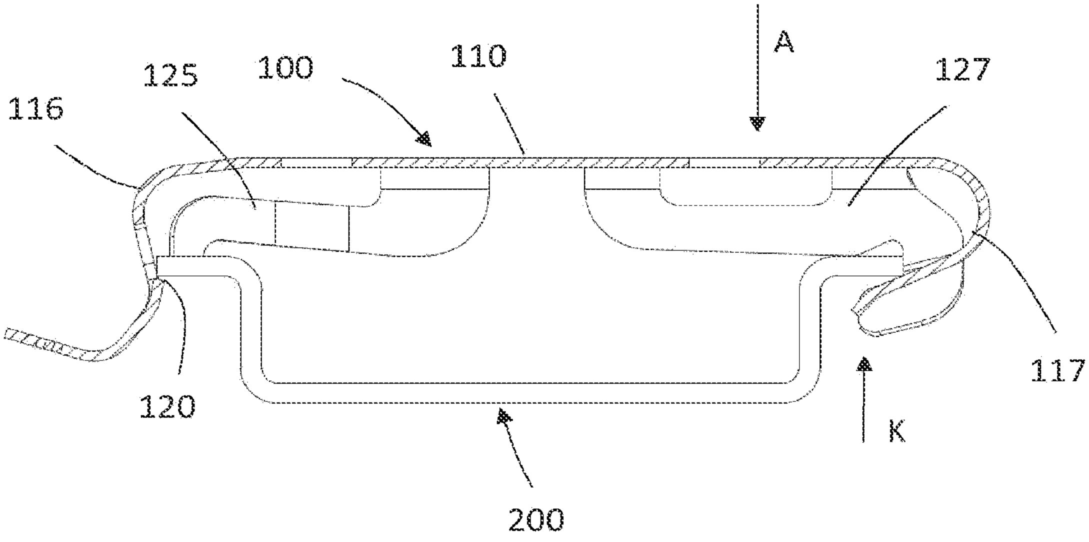
FIG. 5 is a schematic sectional view of the arrangement shown in FIG. 4.

Between the two bends 118, 119, the first latching arm 116 has a latching element 120 for the rear latching of the rail element 200, as can be seen in particular in FIG. 5. Here, the latching element 120 takes the form of a tab cut out of the material of the first latching arm 116, wherein the tab is cut out of the plane of the first latching arm 116 in the direction of the rail element 200. The latching element 120 is formed in the region of the first linear contact L1 of the first latching arm 116. In addition to the linear contact L1, the latching element 120 forms a punctiform contact with the rail element 200. The latching element 120 is formed on the first latching arm 116 approximately at the center of the width of the first latching arm 116.

Furthermore, a tool receiving region 121 in the form of an opening, into which a tool, such as a screwdriver, can engage, is formed on the first latching arm 116, in order to release the first latching arm 116 and thus the connecting apparatus 100 from the rail element 200.

In contrast to the first latching arm 116, the second latching arm 117 has a U-shape, such that the second latching arm 117 has only one bend 122. The linear contact L2 is formed remote from or at a distance from the bend 122, such that the linear contact L2 is formed at a free end or at a free transverse edge 123 of the second latching arm 117.

In addition to the two latching arms 116, 117, the connecting apparatus 100 also has two support arms 124, 125 and two holding arms 126, 127, in order to fasten the connecting apparatus 100 to the rail element 200.

The two support arms 124, 125 are arranged opposite the receiving body 110 in that the first support arm 124 is joined to the first longitudinal side 114 and the second support arm 125 is joined to the second longitudinal side 115. The two support arms 124, 125 are assigned to the first latching arm 116, such that the two support arms 124, 125 together with the first latching arm 116 form a first fastening unit 128. Part of the first fastening unit 128 is also the latching element 120.

The two holding arms 126, 127 are arranged opposite the receiving body 110 in that the first holding arm 126 is joined to the first longitudinal side 114 and the second holding arm 127 is joined to the second longitudinal side 115. The two holding arms 126, 127 are assigned to the second latching arm 117, such that the two holding arms 126, 127 together with the second latching arm 117 form a second fastening unit 129.

With the two support arms 124, 125 and the two holding arms 126, 127, point contacts with the rail element 200 may be formed in each case.

Both the support arms 124, 125 and the holding arms 126, 127 are formed to be bent at a 90° angle to the plane of the receiving body 110, such that the support arms 124, 125 and the holding arms 126, 127 each span planes that are formed perpendicular to the plane of the receiving body 110.

Figure 4:
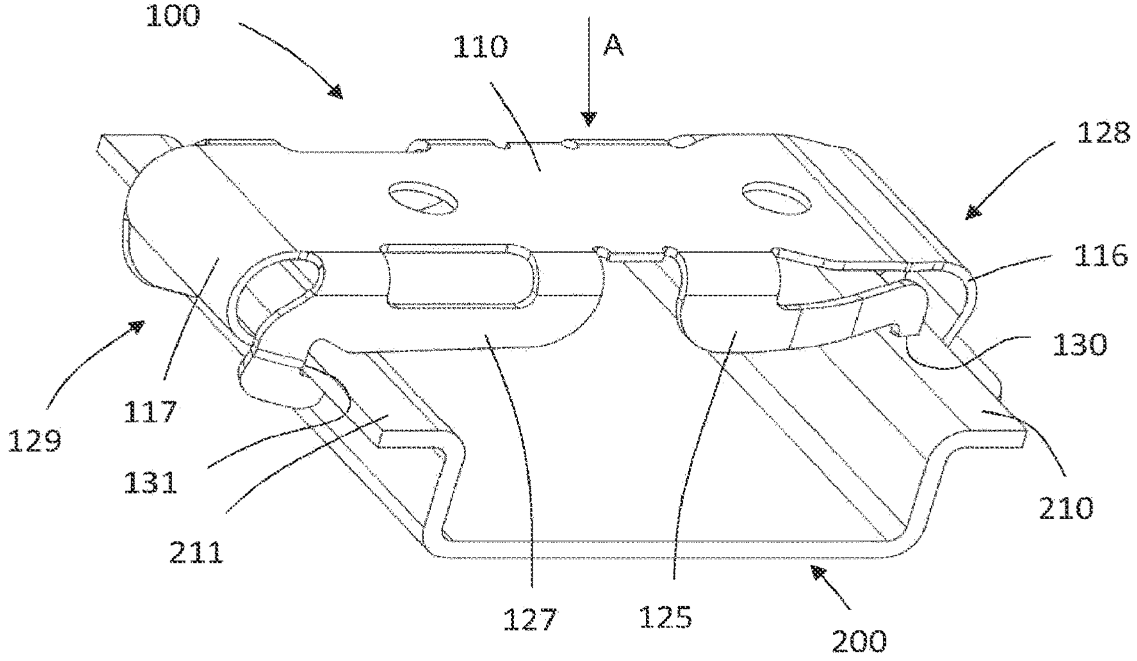
FIG. 4 is a schematic representation of the connecting apparatus shown in FIG. 1 arranged on a rail element.

The two support arms 124, 125 each have a support surface 130 with which a point contact with the rail element 200 can be formed in the fastened state. As can be seen in FIG. 4, the two support arms 124, 125 rest with their contact surface 130 from above on the rail element 200 and thus press on the rail element 200 in the attachment direction A.

In contrast, the two holding arms 126, 127 each have an end section bent in a U-shape 131 that, in the fastened state of the connecting apparatus 100, can form a point contact with the rail element 200 on the rail element 200 in that the holding arm 126, 127 can engage around a region of the rail element 200 by means of the end section 131 bent in a U-shape, as can be seen in FIG. 4.

The two holding arms 126, 127 are positioned in such a way that they laterally overlap the second latching arm 117 at least in regions, as can be seen in FIG. 1, such that the linear contact L2 and the two point contacts formed by the two holding arms 126, 127 may be formed in one plane. The point contacts of the two holding arms 126, 127 act transversely to the attachment direction A.

In contrast, the two support arms 124, 125 do not laterally overlap the first latching arm 116. The linear contact L1 formed by the first latching arm 116 is thus formed in a different plane than the two point contacts formed by the two support arms 124, 125.

The two support arms 124, 125 are each joined to the receiving body 110 via exactly one joining section 132.

In contrast, the two holding arms 126, 127 are each joined to the receiving body 110 via exactly two joining sections 133, 134.

Both the two support arms 124, 125 and the two holding arms 126, 127 are formed to be spring-elastic.

FIGS. 4 and 5 show the arrangement of a connecting apparatus 100 on a rail element 200. Here, the rail element 200 takes the form of a support rail. The rail element 200 has a first outwardly directed lip 210 and a second outwardly directed lip 211. The connecting apparatus 100 is held and fastened to the first lip 210 via the first fastening unit 128 and the connecting apparatus 100 is held and fastened to the second lip 211 via the second fastening unit 129. A contact force K acting counter to the attachment direction A is applied to the rail element 200 via the two latching arms 116, 117, in order to hold the connecting apparatus 100 on the rail element 200.

The first fastening unit 128 forms, with the rail element 200 or with the first lip 210 of the rail element 200 via the first latching arm 116, a linear contact L1 and, via the two support arms 124, 125 and the latching element 120, three point contacts.

The second fastening unit 129 forms, with the rail element 200 or with the second lip 211 of the rail element 200 via the second latching arm 117, a linear contact L2 and, via the two holding arms 126, 127, two point contacts.

Oxide layers on the rail element 200 may be broken open by the contact force K and the linear contacts L1, L2 and the point contacts, whereby particularly low transition resistances between the rail element 200 and the connecting apparatus 100 may be achieved.

The two latching arms 116, 117 and the holding arms 126, 127 overlap the two lips 210, 211 in the attachment direction A. Both the two latching arms 116, 117 and the two holding arms 126, 127 engage behind or engage around the two lips 210, 111 of the rail element 200. However, the two support arms 124, 125 lie on the first lip 210 with their contact surface 130.

FIGS. 6 to 8 show assemblies 400 according to the invention, each having a rail element 200, a connecting apparatus 100 and various current-carrying elements 300, which are fastened to the connecting apparatus 100.

In the embodiment shown in FIG. 6, the current-conducting element 300 is a shield terminal.

In the embodiment shown in FIG. 7, the current-conducting element 300 is a busbar.

In the embodiment shown in FIG. 8, the current-conducting element 300 is a tapping terminal. The connecting apparatus 100 is formed here from an insulating material. Here, the connecting apparatus 100 forms a latching support element.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Connecting apparatus
110 Receiving body

111 Fastening element
112 First transverse side
113 Second transverse side
114 First longitudinal side
115 Second longitudinal side
116 First latching arm
117 Second latching arm
118 First bend
119 Second bend
120 Latching element
121 Tool receiving region
122 Bend
123 Transverse edge
124 First support arm
125 Second support arm
126 First holding arm
127 Second holding arm
128 First fastening unit
129 Second fastening unit
130 Contact surface
131 End section
132 Joining section
133 Joining section
134 Joining section
200 Rail element
210 First lip
211 Second lip
300 Current-conducting element
400 Assembly
L1 First linear contact
L2 Second linear contact
A Attachment direction
K Contact force

The invention claimed is:

1. A connecting apparatus for connecting a current-carrying element to a rail element, comprising:

a receiving body on which the current-conducting element is fastenable, the receiving body having a first transverse side and a second transverse side opposite the first transverse side, and a first longitudinal side and a second longitudinal side opposite the first longitudinal side;

a first latching arm configured to fasten the connecting apparatus to the rail element;

a second latching arm configured to fasten the connecting apparatus to the rail element; and at least one holding arm having an end section bent in a U-shape that forms a point contact with the rail element in a fastened state, the at least one holding arm comprising a first holding arm and a second holding arm, wherein the first holding arm is joined to the first longitudinal side of the receiving body and the second holding arm is joined to the second longitudinal side of the receiving body, wherein the first latching arm is joined to the first transverse side of the receiving body, and wherein the second latching arm is joined to the second transverse side of the receiving body.

2. The connecting apparatus of claim 1, wherein the first latching arm is configured to form a first linear contact with the rail element in a state fastened to the rail element, and/or wherein the second latching arm is configured to form a second linear contact with the rail element in the state fastened to the rail element.

3. The connecting apparatus of claim 1, wherein the first latching arm is joined to the receiving body over an entire length of the first transverse side of the receiving body, and/or wherein the second latching arm is joined to the receiving body over an entire length of the second transverse side of the receiving body.

4. The connecting apparatus of claim 1, wherein the first latching arm has a latching element for a rear latching of the rail element.

5. The connecting apparatus of claim 4, wherein the latching element is formed in a region of a first linear contact.

6. The connecting apparatus of claim 1, wherein the first latching arm has a tool receiving region.

7. The connecting apparatus of claim 1, wherein the first latching arm comprises an S-shaped bend.

8. The connecting apparatus of claim 1, wherein the second latching arm comprises a U-shaped bend.

9. The connecting apparatus of claim 1, further comprising:

at least one support arm having a support surface with which, in a fastened state, a point contact is formed with the rail element.

10. The connecting apparatus of claim 9, wherein the at least one support arm comprises a first support arm and a second support arm, and wherein the first support arm is joined to the first longitudinal side of the receiving body and the second support arm is joined to the second longitudinal side of the receiving body.

11. The connecting apparatus of claim 1, wherein a first support arm and a second support arm form a first fastening unit together with the first latching arm, and wherein the first holding arm and the second holding arm form a second fastening unit together with the second latching arm.

12. An assembly, comprising:

a current-carrying element;

a rail element; and the connecting apparatus of claim 1, via which the current-carrying element is attached to the rail element.

13. The assembly of claim 12, wherein the current-conducting element comprises a busbar, a shield terminal, or a tapping terminal.

14. An electronic device, comprising:

at least one assembly of claim 12.

15. A connecting apparatus for connecting a current-carrying element to a rail element, comprising:

a receiving body on which the current-conducting element is fastenable, the receiving body having a first transverse side and a second transverse side opposite the first transverse side, and a first longitudinal side and a second longitudinal side opposite the first longitudinal side;

a first latching arm configured to fasten the connecting apparatus to the rail element;

a second latching arm configured to fasten the connecting apparatus to the rail element; and at least one holding arm having an end section bent in a U-shape that forms a point contact with the rail element in a fastened state, wherein the first latching arm is joined to the first transverse side of the receiving body, and wherein the second latching arm is joined to the second transverse side of the receiving body.

16. The connecting apparatus of claim 15, wherein the at least one holding arm comprises a first holding arm and a second holding arm, wherein a first support arm and a second support arm form a first fastening unit together with the first latching arm, and wherein the first holding arm and the second holding arm form a second fastening unit together with the second latching arm.

17. The connecting apparatus of claim 15, wherein the first latching arm is configured to form a first linear contact with the rail element in a state fastened to the rail element, and/or wherein the second latching arm is configured to form a second linear contact with the rail element in the state fastened to the rail element.

18. A connecting apparatus for connecting a current-carrying element to a rail element, comprising:

a receiving body on which the current-conducting element is fastenable, the receiving body having a first transverse side and a second transverse side opposite the first transverse side, and a first longitudinal side and a second longitudinal side opposite the first longitudinal side;

a first latching arm configured to fasten the connecting apparatus to the rail element;

a second latching arm configured to fasten the connecting apparatus to the rail element; and at least one support arm having a support surface with which, in a fastened state, a point contact is formed with the rail element, wherein the first latching arm is joined to the first transverse side of the receiving body, and wherein the second latching arm is joined to the second transverse side of the receiving body.

19. The connecting apparatus of claim 18, wherein the at least one support arm comprises a first support arm and a second support arm, and wherein the first support arm is joined to the first longitudinal side of the receiving body and the second support arm is joined to the second longitudinal side of the receiving body.

20. The connecting apparatus of claim 18, wherein the first latching arm is configured to form a first linear contact with the rail element in a state fastened to the rail element, and/or wherein the second latching arm is configured to form a second linear contact with the rail element in the state fastened to the rail element.

* * * * *